US009106766B2

(12) United States Patent
Febonio et al.

(10) Patent No.: US 9,106,766 B2
(45) Date of Patent: Aug. 11, 2015

(54) PHONE CALL MANAGEMENT

(71) Applicant: International Business Machines Corporation, Armonk, NY (US)

(72) Inventors: Barbara Febonio, Rome (IT); Sandro Piccinini, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 13/628,173

(22) Filed: Sep. 27, 2012

(65) Prior Publication Data

US 2014/0086397 A1    Mar. 27, 2014

(51) Int. Cl.
*H04M 11/00*    (2006.01)
*H04M 3/436*    (2006.01)

(52) U.S. Cl.
CPC ............. *H04M 11/00* (2013.01); *H04M 3/436* (2013.01)

(58) Field of Classification Search
CPC ... H01M 1/57; H01M 1/663; H01M 3/42042; H01M 2203/2011; H01M 3/42059; H01M 3/38; H01M 3/42153
USPC .................. 379/93.02, 207.14, 88.26, 142.07, 379/142.06
See application file for complete search history.

(56) References Cited

U.S. PATENT DOCUMENTS

| | | | |
|---|---|---|---|
| 6,917,672 B2 * | 7/2005 | Brown et al. | 379/188 |
| 7,010,288 B2 | 3/2006 | Brown et al. | 455/412.1 |
| 7,010,565 B2 * | 3/2006 | Sampson | 709/202 |
| 7,046,782 B2 | 5/2006 | Miller | 379/207.14 |
| 2002/0059527 A1 | 5/2002 | Pedersen et al. | |
| 2003/0198326 A1 | 10/2003 | Wei | 379/142.14 |
| 2006/0168089 A1 * | 7/2006 | Sampson | 709/207 |
| 2007/0081649 A1 | 4/2007 | Baudino et al. | 379/201.11 |

(Continued)

FOREIGN PATENT DOCUMENTS

| | | |
|---|---|---|
| CN | 101132641 | 2/2008 |
| CN | 101969400 | 2/2011 |

(Continued)

OTHER PUBLICATIONS

Hongzhen et al., "Design and implementation of mobile phone management software based on component technology," 4th International Conference on Wireless Communications, Networking and Mobile Computing, 2008, WiCOM '08, Oct. 2008, pp. 1-4.
International Search Report for International Application No. PCT/IB2013/058258 (filed Sep. 3, 2013), mailed Jan. 16, 2014, 3 pages.

*Primary Examiner* — Amal Zenati
(74) *Attorney, Agent, or Firm* — VanLeeuwen & VanLeeuwen; Thomas E. Tyson

(57)    ABSTRACT

An approach is provided to manage phone calls. The approach is implemented by an information handling system, such as a smart phone. A requestor sends a contact request to another device over a network. If the request is accepted, the requestor receives a token with the token including usage parameters controlling the requestor's ability to contact the recipient by telephone. When the requestor requests to make a call to the recipient, the call is only placed upon successful determination made by comparing the usage parameters included in the token to a set of current call data. If a successful determination is made, the call is placed to the recipient without revealing the recipient's telephone number. However, if the request is denied, the system prevents the requestor for placing a call to the recipient.

31 Claims, 7 Drawing Sheets

(56) References Cited

U.S. PATENT DOCUMENTS

2009/0285380 A1 11/2009 Chen et al.
2010/0331020 A1 12/2010 Modin .......................... 455/466
2012/0057684 A1 3/2012 Brahm et al. .............. 379/93.23

FOREIGN PATENT DOCUMENTS

| WO | WO 2006/006191 A1 | 1/2006 | ............... H04Q 7/32 |
| WO | WO 2011/067030 A1 | 6/2011 | ............ H04M 1/725 |

\* cited by examiner

PHONE CALL MANAGEMENT

TECHNICAL FIELD

The present disclosure relates to an approach that manages sensitive phone numbers. More particularly, the present disclosure can utilize a trusted third party in electronically disseminating phone numbers to requestors on behalf of a recipient.

BACKGROUND OF THE INVENTION

Management of personal phone numbers is a critical issue dealing with multiple aspects such as respecting the privacy of phone number owners to the using the phone number in respect to specific personal policies. Currently, it may happen that a person has an urgent need to call another person but does not known the phone number. However, the person may know another person (a third party) that does have the desired number. It is often not possible for such a third party to provide the needed number without specific owner approval or without violating the privacy of the person. It may also be the case that a person can be called only during on a particular day or time (such as on weekends, during lunch time, after business hours, etc.). In addition, using current technology there is no way to enforce such usage, or restrictions, of the phone number once it has been disseminated.

SUMMARY

An approach is provided to manage phone calls. The approach is implemented by an information handling system, such as a smart phone. A requestor sends a contact request to another device over a network. If the request is accepted, the requestor receives a token with the token including usage parameters controlling the requestor's ability to contact the recipient by telephone. When the requestor requests to make a call to the recipient, the call is only placed upon successful determination made by comparing the usage parameters included in the token to a set of current call data. If a successful determination is made, the call is placed to the recipient without revealing the recipient's telephone number. However, if the request is denied, the system prevents the requestor from placing a call to the recipient.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
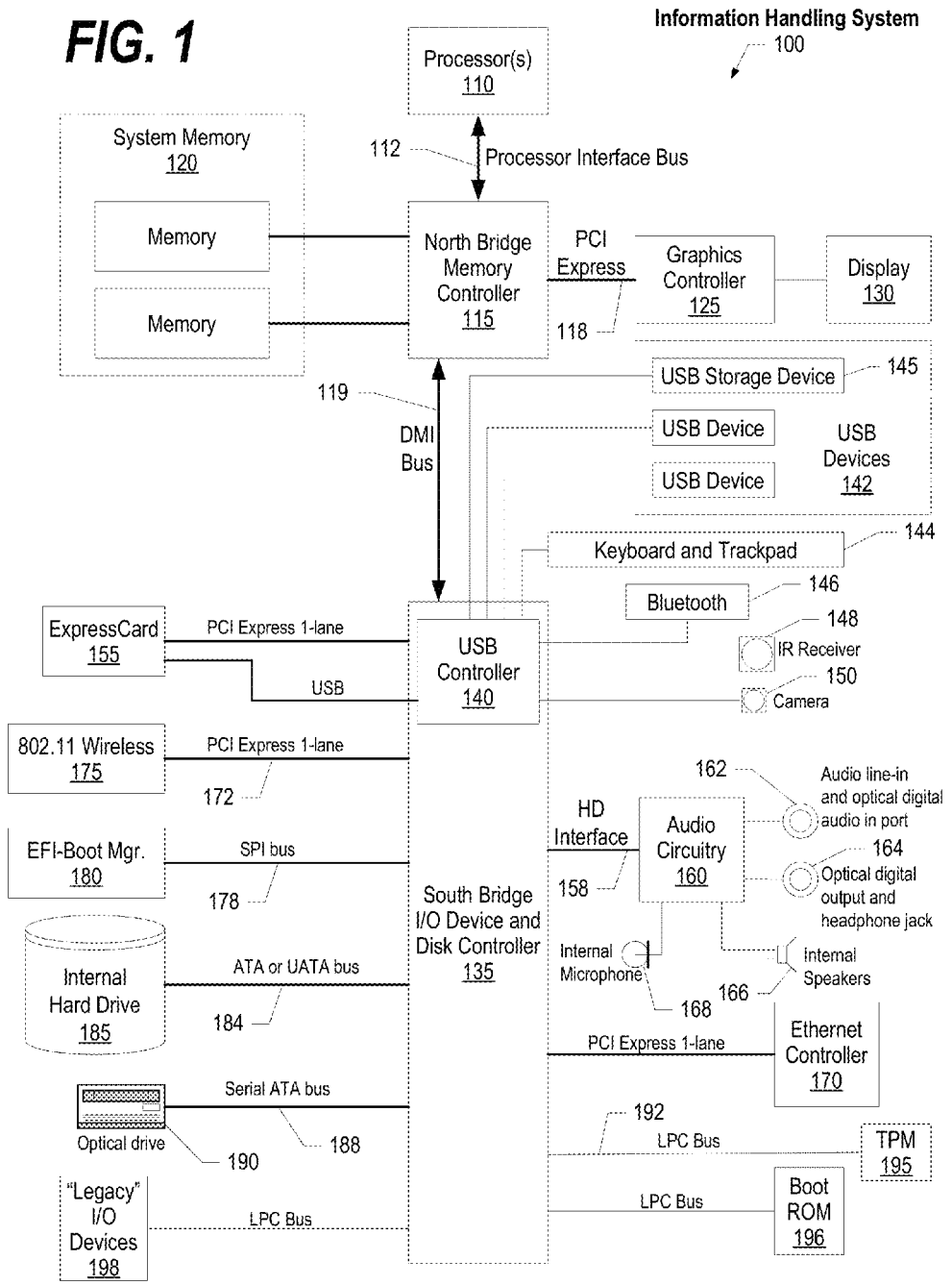
FIG. 1 is a block diagram of a data processing system in which the methods described herein can be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
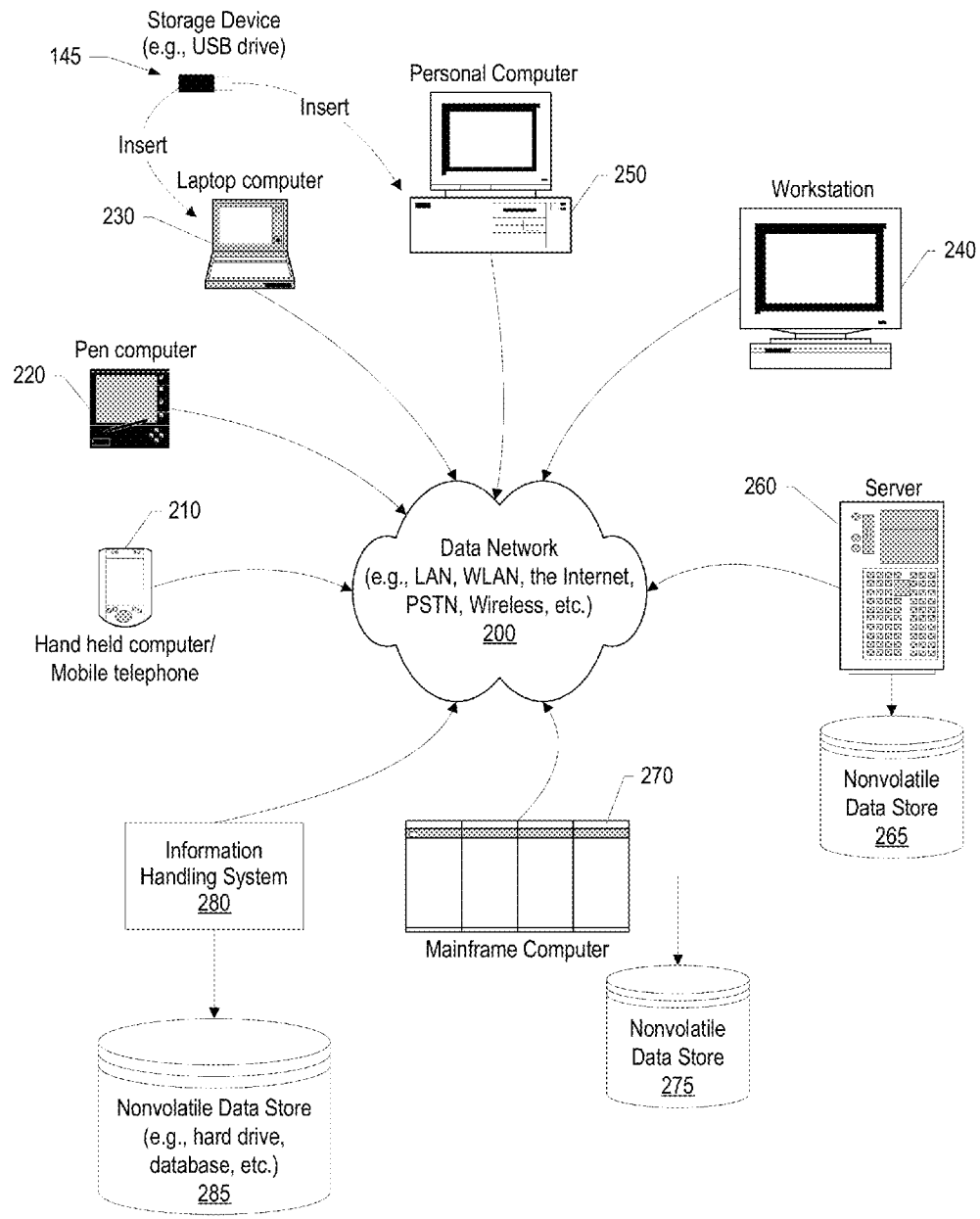
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-7 depict an approach that can be executed on an information handling system and network as shown in FIGS. 1-2. In this approach, an integrated and automatic system for call management is provided. This approach provides the user with the capability to enable a requestor to call a recipient at a specific telephone number without revealing the recipient's telephone number. In this approach, an encrypted token is utilized to set usage parameters such as only permitting a limited number of calls to the recipient, restricting the time of day, day of week, setting a token expiration period, and the like.

Figure 3:
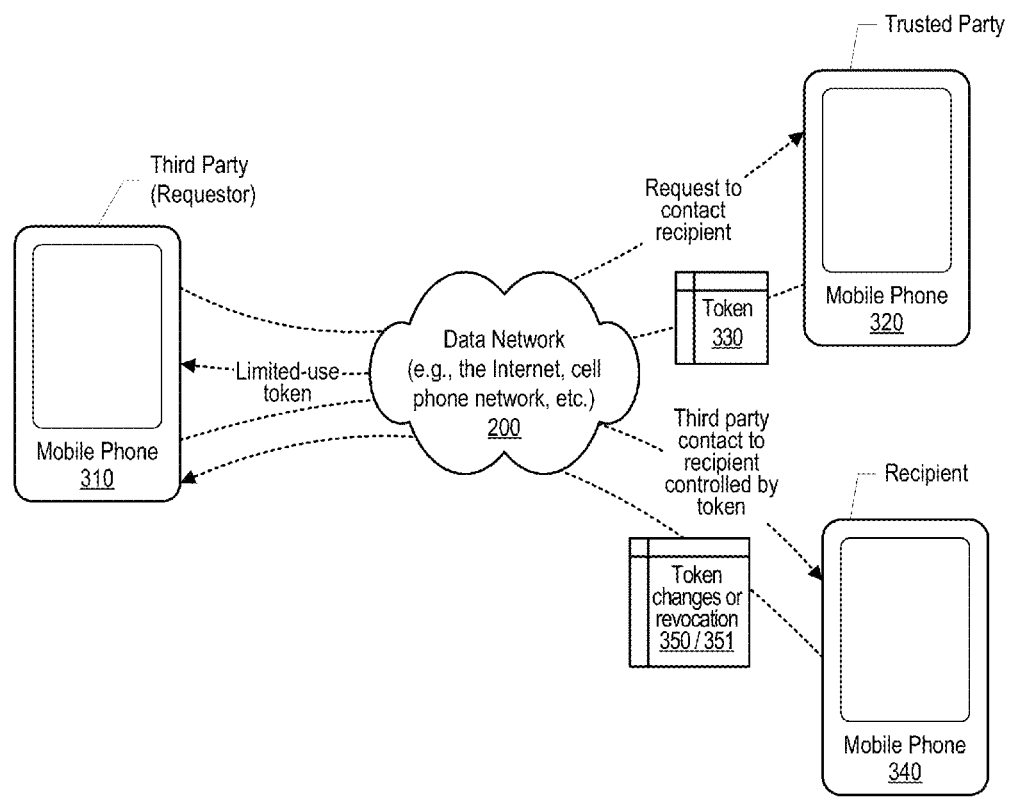
FIG. 3 is a component diagram depicting communication between the various components involved in the phone call management system.

FIG. 3 is a component diagram depicting communication between the various components involved in the phone call management system. Requestor 310 sends a contact request, from a requestor device such as a mobile ("smart") telephone or other information handling system. Requestor device is an information handling system that includes at least one processor and a network adapter, as shown and described in FIG. 1. The contact request is sent through network 200, such as a wireless telephone network, to request receiver 320 with the request receiver being the party that decides whether to grant the contact request. In one embodiment, the receiver is the intended recipient, while in another embodiment, the receiver is a trusted third party that acts on behalf of the intended telephone recipient. For example, a celebrity or public figure may have an agent, staff member, or the like that acts on behalf of the celebrity/public figure as the trusted third party so that the celebrity/public figure is not bothered with contact requests, thereby acting as a filter so only those contact requests that would are desired or advantageous to the celebrity/public figure are accepted with specific usage parameters established for when, how often, etc. the requestor can contact the recipient by telephone. In another example, the recipient may be a child or other person under the care of a parent, guardian, or the like. In this manner, the parent or guardian can act as trusted third party 320 and establish the usage restrictions that control the requestor's ability to contact the recipient (e.g., child or other person under the parent's/guardian's care, etc.). If the contact request is accepted, token 330 is created and returned to the requestor with the token including the aforementioned usage restrictions and the recipient's telephone number (e.g., in an encrypted format, etc.).

After receiving the token, requestor 310 requests to call recipient 340, such as by selecting the recipient's name from an address book stored on the requestor's telephone (e.g., without revealing the recipient's phone number to the requestor). A process compares the usage parameters from token 330 with a set of current call data, such as the day of the week, the date, the time of day, and the number of calls that the requestor has already placed to the recipient. In one embodiment, this process resides and executes on the requestor's information handling system, such as a smart phone, etc. In response to the comparison being to allow the telephone call request, a telephone call is placed to the recipient using the recipient's phone number which is hidden (e.g., encrypted, etc.) from view of the requestor. However, if the comparison reveals that one or more of the usage parameters are not met by the current call data, then the process inhibits the call from being made by the requestor to the recipient.

In one embodiment, recipient 340 can alter or revoke a token that has been granted. When token is altered or revoked, message 350 (token revoked) or message 351 (token modifications) is transmitted from recipient 340. In one embodiment, the message (350/351) is sent directly to the requestor and, when detected, automatically updates the token stored at the requestor's information handling system. In a further embodiment, message 350/351 is also transmitted to trusted third party 320 to inform the trusted third party of the action and to possibly update the recipient's privacy settings used by the trusted third party when creating tokens on the recipient's behalf.

As described above, trusted third party 320 receives, from recipient 340, the granting authority to provide the recipient's telephone number to requestor 310. The trusted third party creates a token with usage parameters such as of cumulative (total) number of calls allowed to be placed to recipient by requestor, day of the week restrictions, time of day restrictions, and date restrictions. The trusted third party sends the recipient's telephone number to the requestor (e.g., included in the token, separately, etc.) with the actual telephone number being protected by being stored in an encrypted fashion. In one embodiment, recipient 340 receives a notification, such as via a short message service (SMS) which also includes an activation trigger and identifiers pertaining to the requestor and the token sent to the requestor. In this embodiment, the recipient's address book is updated and the activation confirmed. Additional, the usage parameters stored in the token can be communicated to the recipient through a separate message. If the usage parameters included in the token are satisfied, then the requestor is allowed to place a telephone call to the recipient, otherwise the telephone call request is denied.

In one embodiment, the activation trigger mechanism utilized by the recipient activates the token to be sent to the requestor (containing the encrypted number, plus the usage restrictions), such as by sending the requestor an SMS (or any other alternative notification mechanism). In one embodiment, the message sent to the requestor updates the requestor's address book with an identifier of the recipient without revealing the recipient's actual phone number (e.g., listing the name of the recipient in the phone book without a phone number, etc.). In this embodiment, if the recipient does not read or accept the SMS message then the token is not activated and the requestor can not call the recipient using the token.

In another embodiment, a handshaking mechanism is provide between recipient 340 and one or more trusted third parties 320 granting the trusted third parties with limited administrative rights of the recipient's privacy profile. In this manner, the recipient's telephone number can be included in a token that is created based on the recipient's privacy selections as encoded in the recipient's privacy profile. The token can then be distributed to requestors without revealing the recipient's telephone number.

Figure 4:
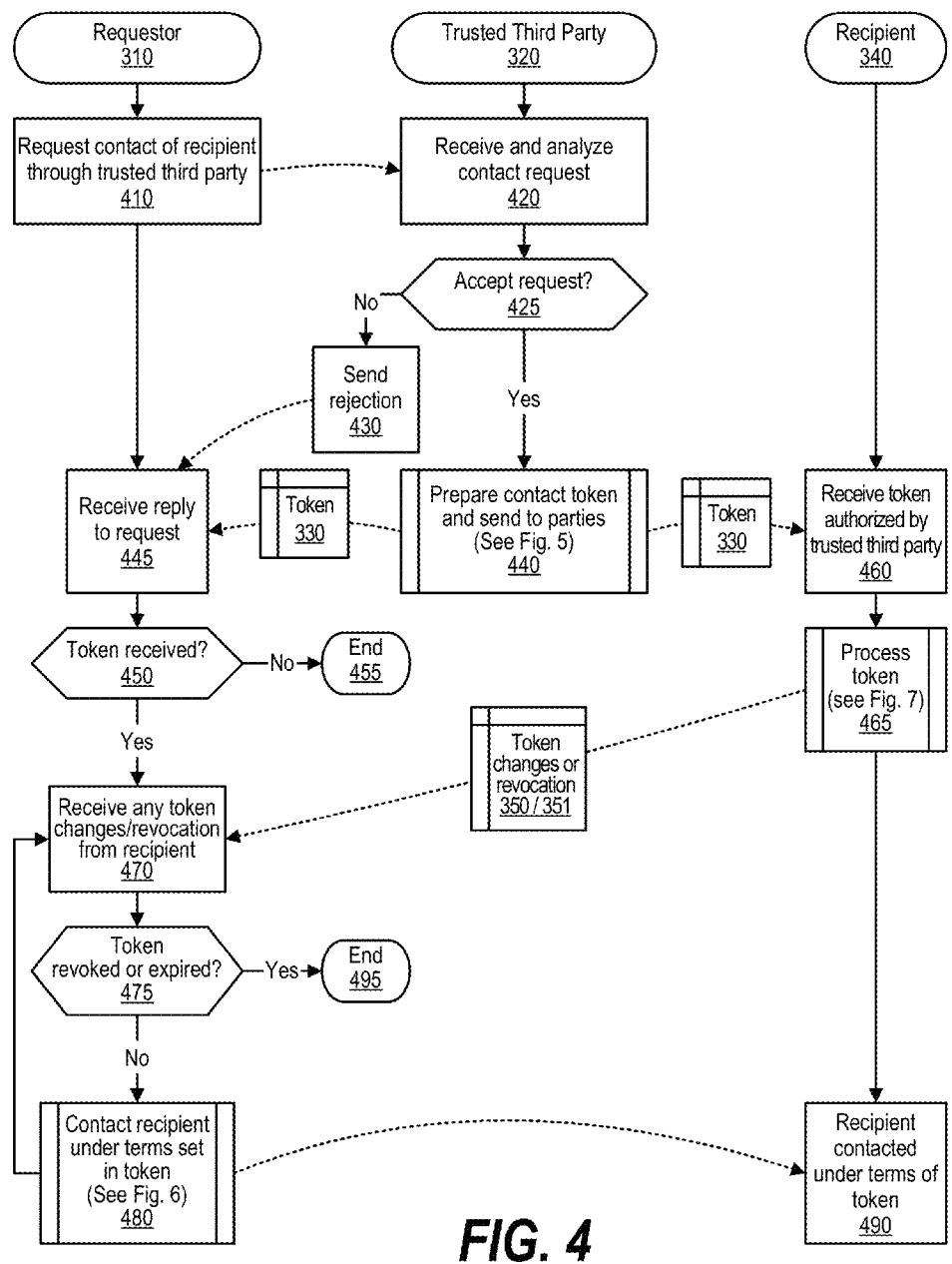
FIG. 4 is a depiction of a flowchart showing the high-level interaction between the various components set forth in FIG. 3.

FIG. 4 is a depiction of a flowchart showing the high-level interaction between the various components set forth in FIG. 3. Requestor processing (310) commences at step 410 at which point the requestor's information handling system sends a contact request to trusted third party 320. Trusted third party processing commences at step 420 upon reception of the contact request received from the requestor.

A decision is made by the trusted third party as to whether to accept the contact request (decision 425). In one embodiment, the decision as to whether to accept the contact request is based on one or more telephone privacy settings previously received from the recipient and stored in a privacy profile that corresponds to the recipient. If the decision is to deny the request, then decision 425 branches to the "no" branch whereupon, at step 430, a denial (rejection) is sent from the trusted third party back to the requestor. On the other hand, if the decision is to allow the request, then decision 425 branches to the "yes" branch whereupon, at predefined process 440, the trusted third party prepares contact token 330 that will be used by the requestor to contact the recipient (see FIG. 5 and corresponding text for processing details). In one embodiment, the token is sent to both the requestor and the recipient so that the recipient can review the usage parameters, make changes to the token, or revoke the token entirely.

Returning to requestor processing, at step 445 the requestor's information handling system receives a reply to the requestor's contact request. A decision is made as to whether the request was accepted (with a token being received) or rejected (decision 450). If the contact request was rejected, then decision 450 branches to the "no" branch and processing ends at 455. On the other hand, if the request was accepted and a token was received from the trusted third party, then decision 450 branches to the "yes" branch whereupon the token is stored in a memory of the requestor's information handling system.

As previously mentioned, in one embodiment, the token (or usage parameters) is also sent to recipient 340. In this embodiment, the recipient's processing commences at step 460 when the token authorized by the trusted third party is received. At predefined process 465, the recipient processes the token and decides whether to alter any of the usage parameters set in the token or decides to revoke the token from the requestor entirely (see FIG. 7 and corresponding text for processing details). A revocation or token modification is transmitted from recipient 340 to requestor 310 in message 350 or 351 (message 350 being a revocation and message 351 being a token modification). While shown occurring before requestor first places a call and contacts the recipient using the token, the recipient, in this embodiment, is able to modify or revoke the token at virtually any time. For example, if the requestor was rude or inconsiderate during a contact made using the token, the recipient may decide to revoke the token at that point to prohibit further calls from being made by the requestor to the recipient.

Returning to requestor processing, at step 470 the requestor receives any modifications to the token or any revocation of the token. A decision is made as to whether the token has been revoked or has expired (decision 475). If the token has been revoked or has expired, then decision 475 branches to the "yes" branch whereupon processing ends at 495. However, if the token has not been revoked and has not expired, then decision 475 branches to the "no" branch whereupon, at predefined process 480, the requestor's call request is processed (see FIG. 6 and corresponding text for processing details). Turning to recipient processing, at step 490 the recipient is contacted by the requestor under the terms set forth in the usage parameters included in the token provided to the requestor. Turning back to requestor processing, after the requestor's call request has been processed, processing loops back to receive any further changes to the token or a token revocation. This looping with calls being allowed from the requestor to the recipient until the token has expired or has been revoked, at which point decision 475 branches to the "yes" branch and processing ends at 495.

Figure 5:
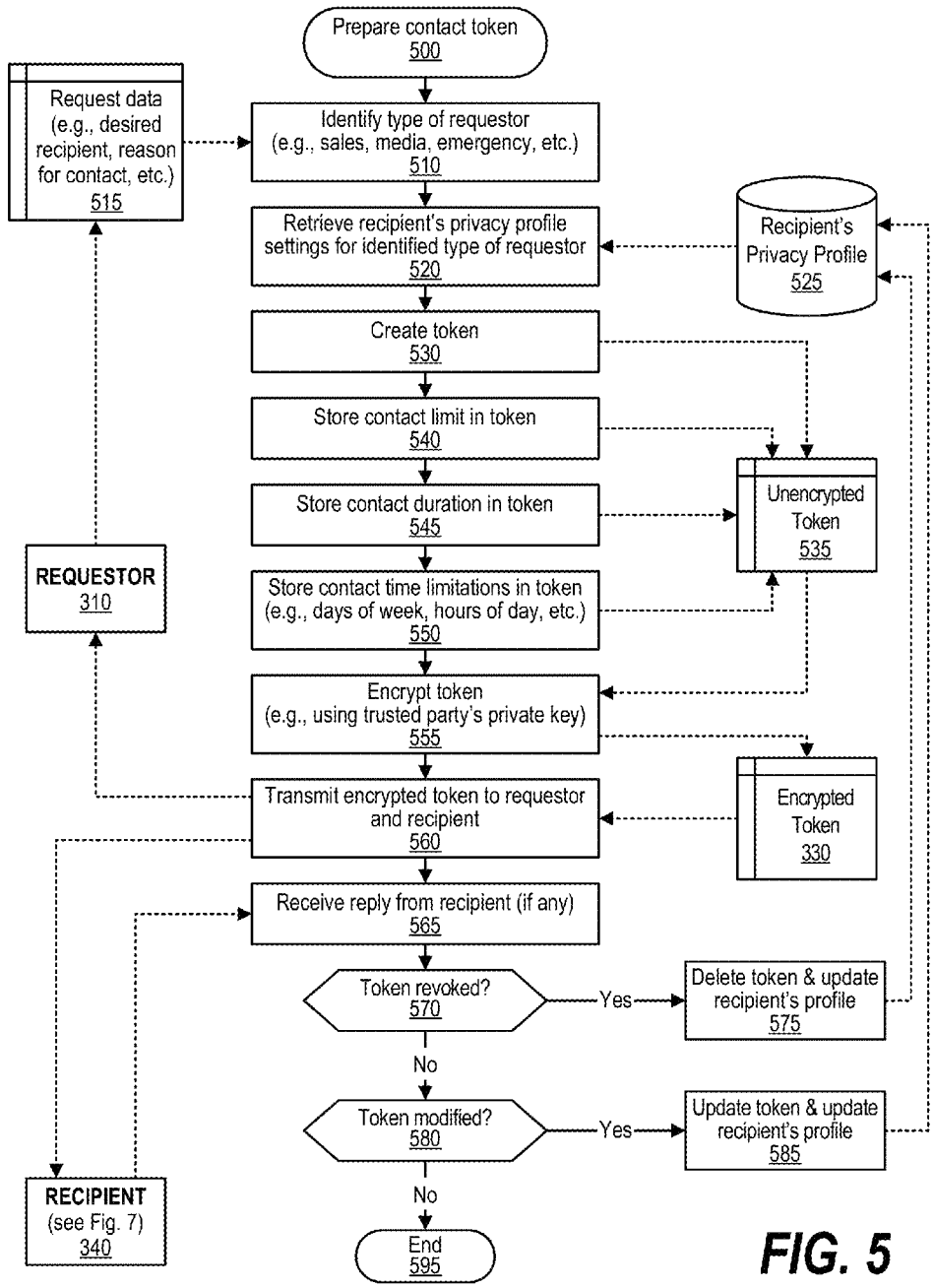
FIG. 5 is a depiction of a flowchart showing the logic performed at a trusted third party's device in preparing and providing an electronic token that establishes parameters between the requestor's telephone calls to the recipient.

FIG. 5 is a depiction of a flowchart showing the logic performed at a trusted third party's device in preparing and providing an electronic token that establishes parameters between the requestor's telephone calls to the recipient. Trusted third party processing commences at 500 whereupon, at step 510 the trusted third party receives the contact request from the requestor with the contact request including request data 515 (e.g., included in the contact request, sent in separate message, etc.). As shown, request data 515 includes the reason for the contact request, information about the requestor, and any other details that might be useful to the trusted third party. At step 510, the trusted third party identifies the type of requestor (e.g., sales person, media person, emergency worker, etc.)

In one embodiment, the recipient can provide privacy preferences which are stored in recipient's privacy profile 525 and which are used to determine whether to grant the contact request as well as, if granted, the usage parameters that should be included in the token. At step 520, the trusted third party retrieves the recipient's usage parameters based on the type of the requestor and other requestor data provided by the requestor. At step 530, unencrypted token 535 is created. Various usage parameters are set in token 535. For example, the number of contacts granted to the requestor is stored in the token at step 540 and time limitations, such as day of week restrictions, time of day restrictions, time duration of the token, etc. are stored in the token at step 550. At step 555 unencrypted token 535 is encrypted, such as by using an asymmetrical key. In one embodiment, the recipient's telephone number is encrypted rather than encrypting the usage parameter data on the token. The encrypted data is stored in encrypted token 330. At step 560, the trusted third party transmits the encrypted token to requestor 310 as well as to recipient 340 (see FIG. 7 and corresponding text for token revocation or modification performed by the recipient). At step 565, the trusted third party receives an optional reply from the recipient. A decision is made as to whether the token has been revoked by the recipient (decision 570). If the token has been revoked, then decision 570 branches to the "yes" branch whereupon, at step 575, the token is deleted and the recipient's privacy profile is updated to reflect the recipient's desire to not be contacted by this requestor. On the other hand, if the reply from the requestor was not a revocation of the token, then decision 570 branches to the "no" branch whereupon another decision is made, this time the decision is as to whether the usage parameters included in the token have been modified by the recipient (decision 580). For example, the trusted third party may not have included a time-of-day restriction and the recipient has decided to only allow the requestor to make contact during business hours. If the token data (usage parameters) have been modified by the recipient, then decision 580 branches to the "yes" branch whereupon, at step 585, the trusted third party updates the token data accordingly and also updates the recipient's privacy profile (e.g., indicating that the recipient only wishes to receive sales calls during business hours, etc.). On the other hand, if the token data (usage parameters) have not been modified by the recipient, then decision 580 branches to the "no" branch whereupon trusted third party processing to create the token ends at 595.

Figure 6:
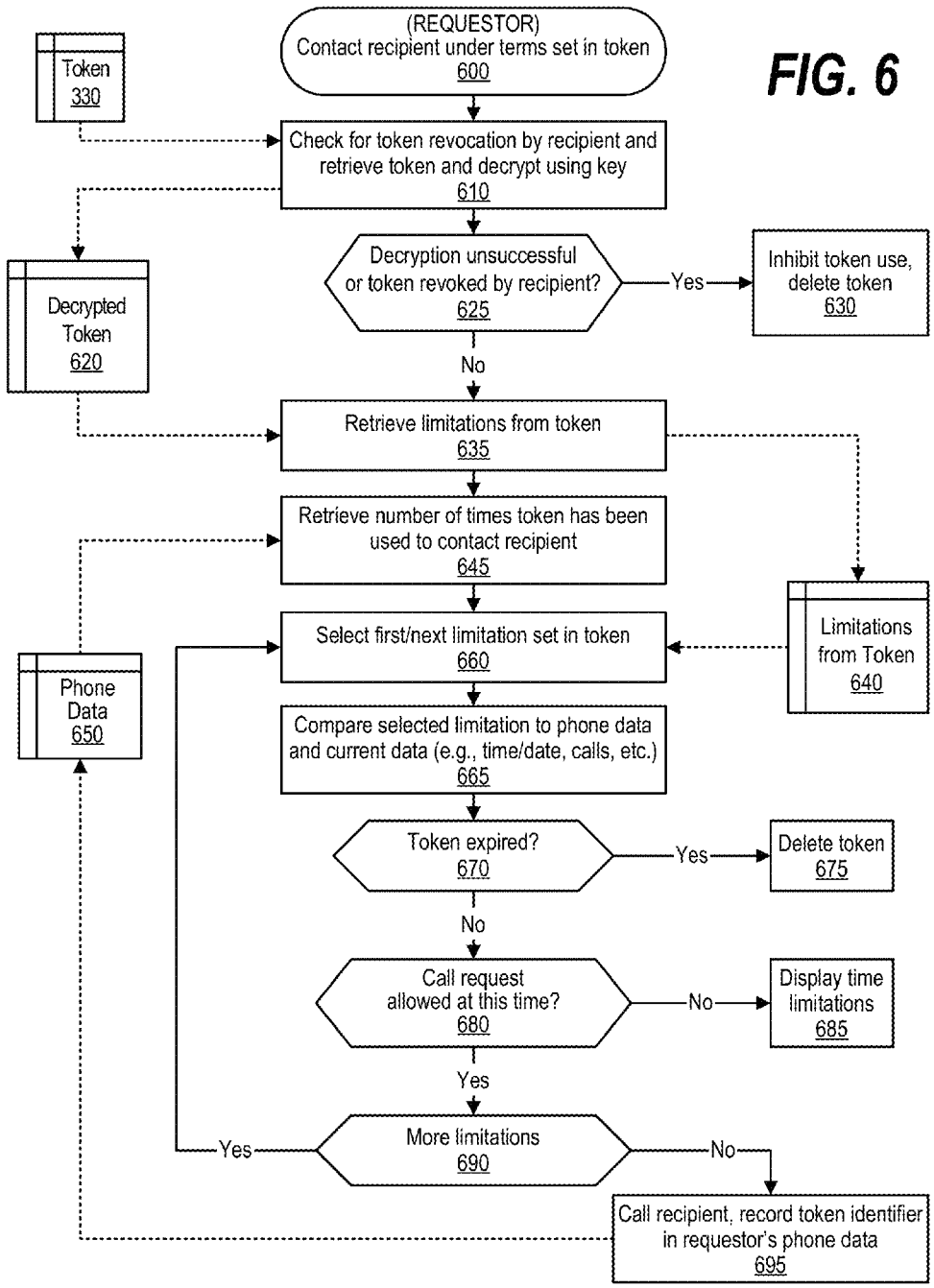
FIG. 6 is a depiction of a flowchart showing the logic performed at the requestor's device to contact the requestor using the token.

FIG. 6 is a depiction of a flowchart showing the logic performed at the requestor's device to contact the requestor using the token. Requestor processing commences at 600 whereupon, at step 610, the requestor's information handling system receives token 330 (e.g., via a communication network, etc.) and the process running on the requestor's device checks for any token revocation performed by recipient and also decrypts the token data (e.g., using the other half of an asymmetrical key, etc.). The decrypted data is stored in decrypted token data 620 in a memory accessible to the requestor's information handling system, however the decrypted token data is not displayed or made accessible to the user of the requestor's information handling system other than through the process.

A decision is made as to whether the decryption of encrypted token 330 was unsuccessful or if the token has been revoked (decision 625). If the token could not be decrypted (e.g., possibly indicating a tampering attempt, etc.), or has been revoked by the recipient, then decision 625 branches to the "yes" branch whereupon, at step 630, the process inhibits use of the token by the user of the requestor device and the token is deleted. On the other hand, if the token is still valid, then decision 625 branches to the "no" branch for further processing.

At step 635, the usage parameters are retrieved from token (unencrypted memory area 620) and stored in memory area 640. The total number of times the recipient has already been called by the requestor is retrieved from phone data 650 stored on a memory of the requestor's information handling system (e.g., smart phone, etc.). At step 660, the first usage parameter is selected by the process. At step 665, the process compares the selected usage parameter with the phone data retrieved at step 645 as well as with current time data (e.g., time of day, date, day of week, etc.). A decision is made, based on the comparison, as to whether to token has expired (decision 670). Expiration can occur when the number of contacts of the recipient has been reached, when a termination date has been reached, etc. If the token has expired, then decision 670 branches to the "yes" branch whereupon, at step 675, the token is deleted. On the other hand, if the token has not yet expired, then decision 670 branches to the "no" branch whereupon, a decision is made as to whether a call request is allowed at this time (decision 680). For example, a usage parameter may stipulate that calls can only be placed to the recipient during business hours and the user is attempting to call the recipient outside of business hours. If the call request is not allowed at this time, then decision 680 branches to the "no" branch whereupon, at step 685 the applicable time-based usage parameters are displayed to the user of the requestor information handling system informing the user of when a call request is allowed.

A decision is made as to whether there are additional usage parameters to process (decision 690). If there are additional usage parameters to process, then decision 690 branches to the "yes" branch which loops back to select and process the next usage parameter as described above. This looping continues until either the token is found to have expired by one of the usage parameters, a time-based usage parameter is found to be violated by the call request, or there are no more usage parameters to process. If there are no more usage parameters to process, then decision 690 branches to the "no" branch whereupon, at step 695, a telephone call is placed to the recipient by the requestor's information handling system (e.g., smart phone, etc.) without revealing the telephone number to the user of the requestor information handling system. In addition, at step 695, a record of the call is stored in phone data (memory area 650). Again, the record of the call is made without revealing the telephone number of the recipient to the user of the requestor information handling system.

Figure 7:
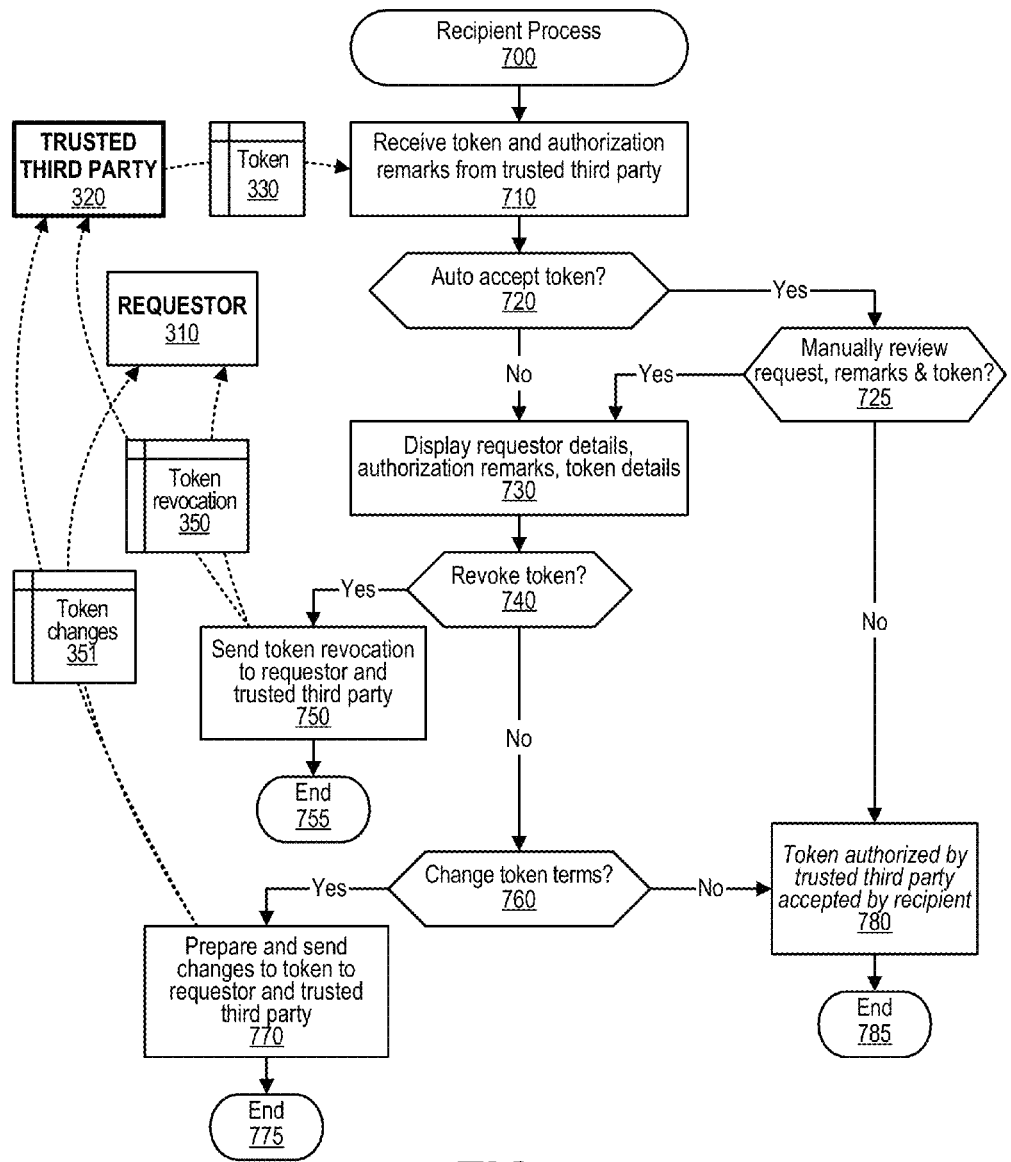
FIG. 7 is a depiction of a flowchart showing the logic performed at the recipient's device to further manage incoming calls from requestors using the electronic tokens provided by the third party.

FIG. 7 is a depiction of a flowchart showing the logic performed at the recipient's device to further manage incoming calls from requestors using the electronic tokens provided by the third party. Recipient processing commences at 700 whereupon, at step 710, the recipient receives token 330 from trusted third party 320 with the token having been created by the trusted third party on the recipient's behalf. In one embodiment, the recipient can set operational parameters, such as whether to automatically accept tokens received from the trusted third party (decision 720). If the recipient is automatically accepting tokens created by the trusted third party, then decision 720 branches to the "yes" branch whereupon a decision is made as to whether the recipient has decided to manually review the contact request, the request remarks (e.g., reasons, etc.) submitted by the requestor, and the usage parameters included in the token (decision 725). If the recipient wishes to undertake a manual review, then decision 725 branches to the "yes" branch for further processing. On the other hand, if the user does not manually request a review of the token, then decision 725 branches to the "no" branch whereupon, at step 780, the token that was created and authorized by the trusted third party is accepted by the recipient and processing ends at 785.

Returning to decisions 720 and 725, if either (a) the recipient is not automatically accepting tokens from the trusted third party (in which case decision 720 branches to the "no" branch), or (b) the recipient has manually requested to review the token data (decision 725 branching to the "yes" branch), then, at step 730, the requestor details are displayed to the user along with any request remarks, authorization remarks provided by the trusted third party, and usage parameter details included in the token. A decision is made by the recipient as to whether to revoke the token from the requestor (decision 740). If the recipient decides to revoke the token, then decision 740 branches to the "yes" branch whereupon, at step 750, token revocation message 350 is transmitted to both requestor 310 as well as to trusted third party 320, and recipient processing thereafter ends at 755.

Returning to decision 740, if the recipient does not decide to revoke the token from the requestor, then decision 740 branches to the "no" branch whereupon a decision is made as to whether the recipient has decided to change any usage parameters that were included in the token (decision 760). If the user has decided to modify the usage parameters (e.g., alter individual parameters, add new usage parameters not originally included in the token, delete usage parameters, etc.), then decision 760 branches to the "yes" branch whereupon, at step 770, the recipient prepares and sends token changes message 351 to both requestor 310 as well as to trusted third party 320, and recipient processing thereafter ends at 775. On the other hand, if the recipient does not decide to change any of the usage parameters included in the token, then decision 760 branches to the "no" branch whereupon, at step 780, the token that was created and authorized by the trusted third party is accepted by the recipient and processing ends at 785.

While the recipient process is shown being triggered by the notification of a token by a trusted third party, the review, revocation, and usage parameter modifications can be performed by the recipient at any time. For example, the recipient could wait until being contacted by the requestor to decide whether to change the usage parameters or revoke the token (e.g., based on the conversation with the requestor, etc.).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method to manage telephone calls, the method, implemented by an information handling system, comprising:
    sending a contact request, from a requestor device, to contact a recipient by telephone, wherein the requestor device includes a processor and a network adapter;
    receiving a token at the requestor device's network adapter, wherein the token includes a recipient telephone number and one or more usage parameters that control the requestor device's ability to contact the recipient by telephone;
    requesting a call, from a requestor telephone, to the recipient, responsive to detecting a selection of a recipient identifier associated with the recipient;
    determining whether to allow the call request by comparing the usage parameters included in the token to a set of current call data;
    controlling calling from the requestor telephone to the recipient based on the comparing; and
    inhibiting a display of the recipient telephone number to a user of the requestor telephone.

2. The method of claim 1 wherein the token is received from a trusted third party.

3. The method of claim 2 wherein the recipient telephone number is stored in the token in an encrypted format.

4. The method of claim 3 further comprising:
    in response to placing the telephone call:
        inhibiting storage of the recipient's telephone number in a call history log stored on the requestor's telephone; and
        storing a record of the placed call in the requestor's telephone, wherein the storing identifies the recipient and inhibits identifying the recipient's telephone number.

5. The method of claim 1 further comprising:
    after receiving the token:
        receiving a token modification at the requestor device, wherein the token modification includes one or more modified usage parameters; and
        updating the token used to determine whether to allow the requestor's call request based on the token modification.

6. The method of claim 1 further comprising:
    after receiving the token:
        receiving a token revocation at the requestor device; and
        inhibiting the call request in response to receiving the token revocation.

7. The method of claim 1 wherein at least one of the usage parameters is selected from a group consisting of a cumulative number of calls allowed to be placed, a day of the week restriction, a time of day restriction, and a date restriction.

8. The method of claim 1 further comprising:
    placing a telephone call from the requestor telephone to the recipient in response to the determination being to allow the call request.

9. The method of claim 1 further comprising:
    inhibiting calling from the requestor telephone to the recipient in response to the determination being to deny the call request.

10. An information handling system comprising:
one or more processors;
a memory coupled to at least one of the processors;
a microphone, accessible by at least one of the processors, used to receive voice input during telephone calls;
a speaker, accessible by at least one of the processors, used to play voice input received during telephone calls;
a network adapter; and
a set of instructions stored in the memory and executed by at least one of the processors to manage telephone calls wherein the set of instructions perform actions of:
sending a contact request, from the information handling system, to contact a recipient by telephone over a network to which the network adapter is connected;
receiving a token at the network adapter, wherein the token includes a recipient telephone number and one or more usage parameters that control the information handling system's ability to contact the recipient by telephone;
requesting a call to the recipient, responsive to detecting a selection of a recipient identifier associated with the recipient;
determining whether to allow the call request by comparing the usage parameters included in the token to a set of current call data;
controlling calling from the requestor device to the recipient based on the comparing; and
inhibiting a display of the recipient telephone number to a user of the requestor telephone.

11. The information handling system of claim 10 wherein the token is received from a trusted third party.

12. The information handling system of claim 10 wherein the recipient telephone number is stored in the token in an encrypted format.

13. The information handling system of claim 12 wherein the set of instructions performs additional actions comprising:
in response to placing the telephone call:
inhibiting storage of the recipient's telephone number in a call history log stored on the information handling system; and
storing a record of the placed call in the memory, wherein the storing identifies the recipient and inhibits identifying the recipient's telephone number.

14. The information handling system of claim 10 wherein the set of instructions performs additional actions comprising:
after receiving the token:
receiving a token modification at the network adapter, wherein the token modification includes one or more modified usage parameters; and
updating the token used to determine whether to allow the requestor's call request based on the token modification.

15. The information handling system of claim 10 wherein the set of instructions performs additional actions comprising:
after receiving the token:
receiving a token revocation at the network adapter; and
inhibiting the call request in response to receiving the token revocation.

16. The information handling system of claim 10 wherein at least one of the usage parameters is selected from a group consisting of a cumulative number of calls allowed to be placed, a day of the week restriction, a time of day restriction, and a date restriction.

17. The information handling system of claim 10 wherein the set of instructions perform further actions comprising:
placing a telephone call from the requestor telephone to the recipient in response to the determination being to allow the call request.

18. The information handling system of claim 10 wherein the set of instructions perform further actions comprising:
inhibiting calling from the requestor telephone to the recipient in response to the determination being to deny the call request.

19. A computer program product stored in a non-transitory computer readable medium, comprising computer instructions that, when executed by an information handling system, causes the information handling system to perform actions comprising:
sending a contact request, from a requestor device, to contact a recipient by telephone, wherein the requestor device includes a processor and a network adapter;
receiving a token at the requestor device's network adapter, wherein the token includes a recipient telephone number and one or more usage parameters that control the requestor device's ability to contact the recipient by telephone;
requesting a call, from a requestor telephone, to the recipient, responsive to detecting a selection of a recipient identifier associated with the recipient;
determining whether to allow the call request by comparing the usage parameters included in the token to a set of current call data;
controlling calling from the requestor device to the recipient based on the comparing; and; and
inhibiting a display of the recipient telephone number to a user of the requestor telephone.

20. The computer program product of claim 19 wherein the token is received from a trusted third party.

21. The computer program product of claim 20 wherein the recipient telephone number is stored in the token in an encrypted format.

22. The computer program product of claim 21 wherein the actions further comprise:
in response to placing the telephone call:
inhibiting storage of the recipient's telephone number in a call history log stored on the requestor's telephone; and
storing a record of the placed call in the requestor's telephone, wherein the storing identifies the recipient and inhibits identifying the recipient's telephone number.

23. The computer program product of claim 19 wherein the actions further comprise:
after receiving the token:
receiving a token modification at the requestor device, wherein the token modification includes one or more modified usage parameters; and
updating the token used to determine whether to allow the requestor's call request based on the token modification.

24. The computer program product of claim 19 wherein the actions further comprise:
after receiving the token:
receiving a token revocation at the requestor device; and
inhibiting the call request in response to receiving the token revocation.

25. The computer program product of claim 19 wherein at least one of the usage parameters is selected from a group consisting of a cumulative number of calls allowed to be placed, a day of the week restriction, a time of day restriction, and a date restriction.

26. The computer program product of claim 19 wherein the information handling system performs further actions comprising:
   placing a telephone call from the requestor telephone to the recipient in response to the determination being to allow the call request.

27. The computer program product of claim 19 wherein the information handling system performs further actions comprising:
   inhibiting calling from the requestor telephone to the recipient in response to the determination being to deny the call request.

28. A method to manage telephone calls, the method, implemented by an information handling system, comprising:
   receiving, at a third party device, a contact request from a requestor device, the contact request being to contact a recipient by telephone, wherein the third party device includes a processor and a network adapter;
   determining whether to accept the contact request;
   in response to accepting the contact request, creating a token, wherein the token includes one or more usage parameters and a telephone number associated with the recipient, and wherein the usage parameters control the requestor's ability to contact the recipient by telephone, and wherein the usage parameters inhibit the display of the telephone number to the requestor; and
   transmitting the created token to the requestor via the network adapter.

29. The method of claim 28 further comprising:
   receiving one or more telephone privacy settings from the recipient; and
   updating a telephone privacy profile corresponding to the recipient using the received privacy settings.

30. The method of claim 29 wherein the determination of whether to accept the contact request further comprises:
   retrieving the telephone privacy settings from the telephone privacy profile; and
   comparing the retrieved telephone privacy settings with one or more attributes corresponding to the contact request.

31. The method of claim 28 wherein at least one of the usage parameters is selected from a group consisting of a cumulative number of calls allowed to be placed, a day of the week restriction, a time of day restriction, and a date restriction, and wherein the telephone number included in the token is stored in an encrypted format.

* * * * *